(12) United States Patent
Wang et al.

(10) Patent No.: US 10,169,203 B2
(45) Date of Patent: Jan. 1, 2019

(54) TEST SIMULATION FOR SOFTWARE DEFINED NETWORKING ENVIRONMENTS

(71) Applicant: AT&T Intellectual Property I, L.P., Atlanta, GA (US)

(72) Inventors: Zhenzhen Wang, Holmdel, NJ (US); Teh-Hsin K. Wu, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 265 days.

(21) Appl. No.: 14/882,596

(22) Filed: Oct. 14, 2015

(65) Prior Publication Data

US 2017/0109260 A1    Apr. 20, 2017

(51) Int. Cl.
G06F 11/36   (2006.01)
H04L 12/24   (2006.01)
H04L 12/26   (2006.01)

(52) U.S. Cl.
CPC ...... *G06F 11/3664* (2013.01); *G06F 11/3684* (2013.01); *G06F 11/3688* (2013.01);
(Continued)

(58) Field of Classification Search
CPC ............ G06F 11/3664; G06F 11/3684; G06F 11/3688; G06F 11/3692; H04L 41/5038; H04L 41/5074; H04L 43/50
(Continued)

(56) References Cited

U.S. PATENT DOCUMENTS 6,889,160 B2   5/2005   Sabiers et al.
8,335,678 B2   12/2012  Hughes et al.
(Continued)

FOREIGN PATENT DOCUMENTS

WO   WO 2006125356   11/2006
WO   WO 2014120214    8/2014
(Continued)

OTHER PUBLICATIONS

International Search Report and Written Opinion dated Jan. 19, 2017 in International Application No. PCT/US2016/056275.
(Continued)

*Primary Examiner* — Li B. Zhen
*Assistant Examiner* — Sen Thong Chen
(74) *Attorney, Agent, or Firm* — Hartman & Citrin LLC (57) ABSTRACT

Concepts and technologies are disclosed herein for test simulation for software defined networking environments. A computing device can receive a service request comprising a request to instantiate a service and create a service order based on the service request. The service order can include instructions to instantiate the service. The computing device can replicate the service order to obtain a replicated service order that includes instructions to instantiate a replicated service in a test environment, test paths and connections associated with the replicated service within the test environment using a test simulator, test device outage handling functionality of the replicated service within the test environment using the test simulator, test network outage handling functionality of the replicated service within the test environment using the test simulator, verify the replicated service, and initiate instantiation of the service requested by the service request.

20 Claims, 5 Drawing Sheets

(52) U.S. Cl.
CPC ...... *G06F 11/3692* (2013.01); *H04L 41/5038* (2013.01); *H04L 41/5074* (2013.01); *H04L 43/50* (2013.01)

(58) Field of Classification Search
USPC ......................................................... 717/104
See application file for complete search history.

(56) References Cited

U.S. PATENT DOCUMENTS

| | | | |
|---|---|---|---|
| 8,750,288 B2 | 6/2014 | Nakil et al. | |
| 8,762,486 B1 | 6/2014 | Butaud et al. | |
| 8,978,102 B2 | 3/2015 | Hughes et al. | |
| 9,007,922 B1 | 4/2015 | Mittal et al. | |
| 9,100,282 B1 | 8/2015 | Raps et al. | |
| 9,588,799 B1 * | 3/2017 | Burruss | G06F 9/45558 |
| 2004/0005038 A1 * | 1/2004 | Garbanati | H04L 43/50 |
| | | | 379/15.01 |
| 2004/0162898 A1 * | 8/2004 | Rich | H04L 43/50 |
| | | | 709/224 |
| 2009/0323672 A1 * | 12/2009 | Gupta | H04W 12/04 |
| | | | 370/352 |
| 2010/0014431 A1 | 1/2010 | Bajpay et al. | |
| 2010/0131799 A1 * | 5/2010 | Wu | H04L 41/0663 |
| | | | 714/26 |
| 2010/0145760 A1 * | 6/2010 | Cambre | G06Q 30/00 |
| | | | 709/225 |
| 2011/0122768 A1 * | 5/2011 | George | H04L 41/145 |
| | | | 370/228 |
| 2011/0299389 A1 * | 12/2011 | Mau | H04L 47/11 |
| | | | 370/230 |
| 2012/0167044 A1 * | 6/2012 | Fortier | G06F 9/455 |
| | | | 717/121 |
| 2013/0080999 A1 * | 3/2013 | Yang | G06F 11/3664 |
| | | | 717/124 |
| 2013/0262931 A1 * | 10/2013 | Siddalingesh | G06F 11/3672 |
| | | | 714/28 |
| 2014/0098711 A1 * | 4/2014 | Thubert | H04L 45/128 |
| | | | 370/255 |
| 2014/0195666 A1 | 7/2014 | Dumitriu et al. | |
| 2014/0337674 A1 | 11/2014 | Ivancic et al. | |
| 2015/0043915 A1 | 2/2015 | Patel et al. | |
| 2015/0124583 A1 | 5/2015 | May et al. | |
| 2015/0188772 A1 | 7/2015 | Gasparakis | |
| 2015/0220423 A1 * | 8/2015 | Kraus | G06F 11/3684 |
| | | | 717/135 |
| 2015/0234725 A1 | 8/2015 | Cillis et al. | |
| 2015/0280980 A1 * | 10/2015 | Bitar | H04L 41/5051 |
| | | | 709/226 |
| 2015/0318935 A1 * | 11/2015 | Hudson | H04L 1/244 |
| | | | 455/67.11 |
| 2016/0203074 A1 * | 7/2016 | Van Grinsven | G06F 8/61 |
| | | | 714/38.1 |
| 2016/0321739 A1 * | 11/2016 | Corlett | G06Q 30/0635 |
| 2016/0328316 A1 * | 11/2016 | Balsavias | G06F 11/3684 |

FOREIGN PATENT DOCUMENTS

| | | |
|---|---|---|
| WO | WO 2014174720 | 10/2014 |
| WO | WO 2015047451 | 4/2015 |

OTHER PUBLICATIONS

Miao et al., "Generative Models for Ticket Resolution in Expert Networks," Proceedings of the 16th ACM SIGKDD International Conference on Knowledge Discovery and Data Mining, KDD'10, Jul. 25-28, 2010, ACM 2010.

* cited by examiner

TEST SIMULATION FOR SOFTWARE DEFINED NETWORKING ENVIRONMENTS

BACKGROUND

Service creation, maintenance, and delivery for communications networks have evolved over the past several years. For example, instead of deploying hardware and software to networks, virtualization of services and service components is sometimes used to create service and/or network functions on distributed computing platforms. These "cloud" computing architectures and technologies have resulted in a change to the traditional hardware-software model by allowing network operators to create and deploy services on commercial-off-the-shelf ("COTS") hardware. This can allow flexibility in terms of scaling, locating, and/or using the services.

SUMMARY

The present disclosure is directed to test simulation for software defined networking environments. A computing device can execute a test simulator and a service creation module. The service creation module can be interacted with to order and/or create services. According to various embodiments, a service request can be created and/or received via the service creation module. The computing device can be configured to generate, based upon the service request, a service order. The service order can include instructions for instantiating and/or activating the service within a software defined networking environment.

According to various embodiments of the concepts and technologies described herein, the computing device can be configured to perform testing of the service prior to deployment and/or instantiation of the service. In particular, embodiments of the concepts and technologies described herein include replicating the service order to obtain a replicated service order. The replicated service order can be configured to prompt instantiation of a version of the service (referred to herein as the replicated service) within a test environment hosted by the software defined networking environment. The replicated service can be tested by the computing device, errors can be corrected, and a service order for instantiating and/or activating the service within the software defined networking environment can be transmitted to an orchestration function by the computing device.

According to various embodiments of the concepts and technologies described herein, the computing device can test the replicated service using one or more test scripts. The test scripts can include one or more extensible markup language files. The test scripts can simulate various types of conditions that may be encountered by the service once deployed. Thus, the test scripts can simulate, for example, device outages and/or network outages. The response of the replicated service to the simulated device outages and/or network outages can be monitored and performance of the replicated service can be determined or measured based upon the response. Additionally, or alternatively, the computing device can use the test scripts to test paths and connections associated with the replicated service, as well as to test trouble ticket handling functionality associated with the replicated service. Any errors in the replicated service can be detected and/or logged, and the service order can be updated. The final service order can be transmitted to the orchestration function to effect instantiation of the service. The service therefore can be verified through the testing illustrated and described herein prior to deployment.

According to one aspect of the concepts and technologies disclosed herein, a system is disclosed. The system can include a processor and a memory. The memory can store computer-executable instructions that, when executed by the processor, cause the processor to perform operations. The operations can include receiving a service request including a request to instantiate a service, creating a service order based on the service request, where the service order can include instructions to instantiate the service. The operations also can include replicating the service order to obtain a replicated service order that includes instructions to instantiate a replicated service in a test environment, testing paths and connections associated with the replicated service within the test environment using a test simulator, testing device outage handling functionality of the replicated service within the test environment using the test simulator, testing network outage handling functionality of the replicated service within the test environment using the test simulator, verifying the replicated service, and initiating instantiation of the service requested by the service request.

In some embodiments, testing the device outage handling functionality can include verifying device outage trouble ticket generation, verifying linking of the device outage trouble ticket to a network ticket, and verifying that the device outage trouble ticket is routed to an appropriate recipient. In some embodiments, the service request can be received via a service creation portal. In some embodiments, the system also can include a software defined networking environment. The test environment can be hosted within the software defined networking environment. In some embodiments, the computer-executable instructions, when executed by the processor, cause the processor to perform operations further including testing trouble ticket handling functionality of the replicated service within the test environment using the test simulator. Testing the trouble ticket handling functionality can include determining if the replicated service closes a trouble ticket after a failure associated with the trouble ticket has been resolved.

In some embodiments, the system also can include a library that can store test scripts. In some embodiments, testing the device outage handling functionality can include simulating a device outage using the test scripts. The test scripts can include extensible markup language files. In some embodiments, testing the network outage handling functionality can include simulating a network outage using the test scripts, where the test scripts can include an extensible markup language file. In some embodiments, testing the network outage handling functionality can include determining if network traffic is rerouted to a shortest available path by the replicated service in response to a simulated network outage. The replicated service can be verified if the network traffic is rerouted to the shortest available path by the replicated service in response to the simulated network outage. In some embodiments, testing the paths and connections can include determining if any paths and connections of the replicated service support communications during operation of the replicated service. The paths and connections can be verified if the paths and connections support the communications.

According to another aspect of the concepts and technologies disclosed herein, a method is disclosed. The method can include receiving, at a processor that executes a service creation module and a test simulator, a service request including a request to instantiate a service. The processor can create a service order based on the service request. The service order can include instructions to instantiate the service. The method also can include replicating, by the processor, the service order to obtain a replicated service order that includes instructions to instantiate a replicated service in a test environment, testing, by the processor, paths and connections associated with the replicated service within the test environment using the test simulator, testing, by the processor, device outage handling functionality of the replicated service within the test environment using the test simulator, testing, by the processor, network outage handling functionality of the replicated service within the test environment using the test simulator, verifying, by the processor, the replicated service, and initiating, by the processor, instantiation of the service requested by the service request.

In some embodiments, the test environment can be hosted within a software defined networking environment. In some embodiments, the method also can include testing trouble ticket handling functionality of the replicated service within the test environment using the test simulator. Testing the trouble ticket handling functionality can include determining if the replicated service closes a trouble ticket after a failure associated with the trouble ticket has been resolved. In some embodiments, testing the device outage handling functionality can include simulating a device outage using test scripts. Testing the network outage handling functionality can include simulating a network outage using the test scripts. The test scripts can include extensible markup language files. In some embodiments, testing the network outage handling functionality can include determining if network traffic is rerouted to a shortest available path by the replicated service in response to a simulated network outage, and the replicated service can be verified if the network traffic is rerouted to the shortest available path by the replicated service in response to the simulated network outage.

According to yet another aspect, a computer storage medium is disclosed. The computer storage medium can have computer-executable instructions stored thereon that, when executed by a processor, cause the processor to perform operations. The operations can include receiving a service request including a request to instantiate a service, creating a service order based on the service request, the service order including instructions to instantiate the service, replicating the service order to obtain a replicated service order that includes instructions to instantiate a replicated service in a test environment, testing paths and connections associated with the replicated service within the test environment using a test simulator, testing device outage handling functionality of the replicated service within the test environment using the test simulator, testing network outage handling functionality of the replicated service within the test environment using the test simulator, verifying the replicated service, and initiating instantiation of the service requested by the service request.

In some embodiments, the computer-executable instructions, when executed by the processor, cause the processor to perform operations further including testing trouble ticket handling functionality of the replicated service within the test environment using the test simulator. Testing the trouble ticket handling functionality can include determining if the replicated service closes a trouble ticket after a failure associated with the trouble ticket has been resolved. In some embodiments, testing the device outage handling functionality can include simulating a device outage using test scripts. Testing the network outage handling functionality can include simulating a network outage using the test scripts. The test scripts can include extensible markup language files.

In some embodiments, testing the network outage handling functionality can include determining if network traffic is rerouted to a shortest available path by the replicated service in response to a simulated network outage, and the replicated service can be verified if the network traffic is rerouted to the shortest available path by the replicated service in response to the simulated network outage. In some embodiments, the test environment can be hosted within a software defined networking environment.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to test simulation for software defined networking environments. A computing device can execute a test simulator and a service creation module. The service creation module can be interacted with to order and/or create services. According to various embodiments, a service request can be created and/or received via the service creation module. The computing device can be configured to generate, based upon the service request, a service order. The service order can include instructions for instantiating and/or activating the service within a software defined networking environment.

According to various embodiments of the concepts and technologies described herein, the computing device can be configured to perform testing of the service prior to deployment and/or instantiation of the service. In particular, embodiments of the concepts and technologies described herein include replicating the service order to obtain a replicated service order. The replicated service order can be configured to instantiate a version of the service (referred to herein as the replicated service) within a test environment hosted by the software defined networking environment. The replicated service can be tested by the computing device, errors can be corrected by the computing device, and a service order for instantiating and/or activating the service within the software defined networking environment can be transmitted to an orchestration function by the computing device.

According to various embodiments of the concepts and technologies described herein, the computing device can test the replicated service using one or more test scripts. The test scripts can include one or more extensible markup language files. The test scripts can simulate device outages and/or network outages. The response of the replicated service to the simulated device outages and/or network outages can be monitored and performance of the replicated service therefore can be determined. Additionally, or alternatively, the computing device can use the test scripts to test paths and connections associated with the replicated service, as well as trouble ticket handling functionality associated with the replicated service. Any errors in the replicated service can be detected and/or logged, and the service order can be updated. The final service order can be transmitted to the orchestration function to effect instantiation of the service, which has been verified through the testing illustrated and described herein.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
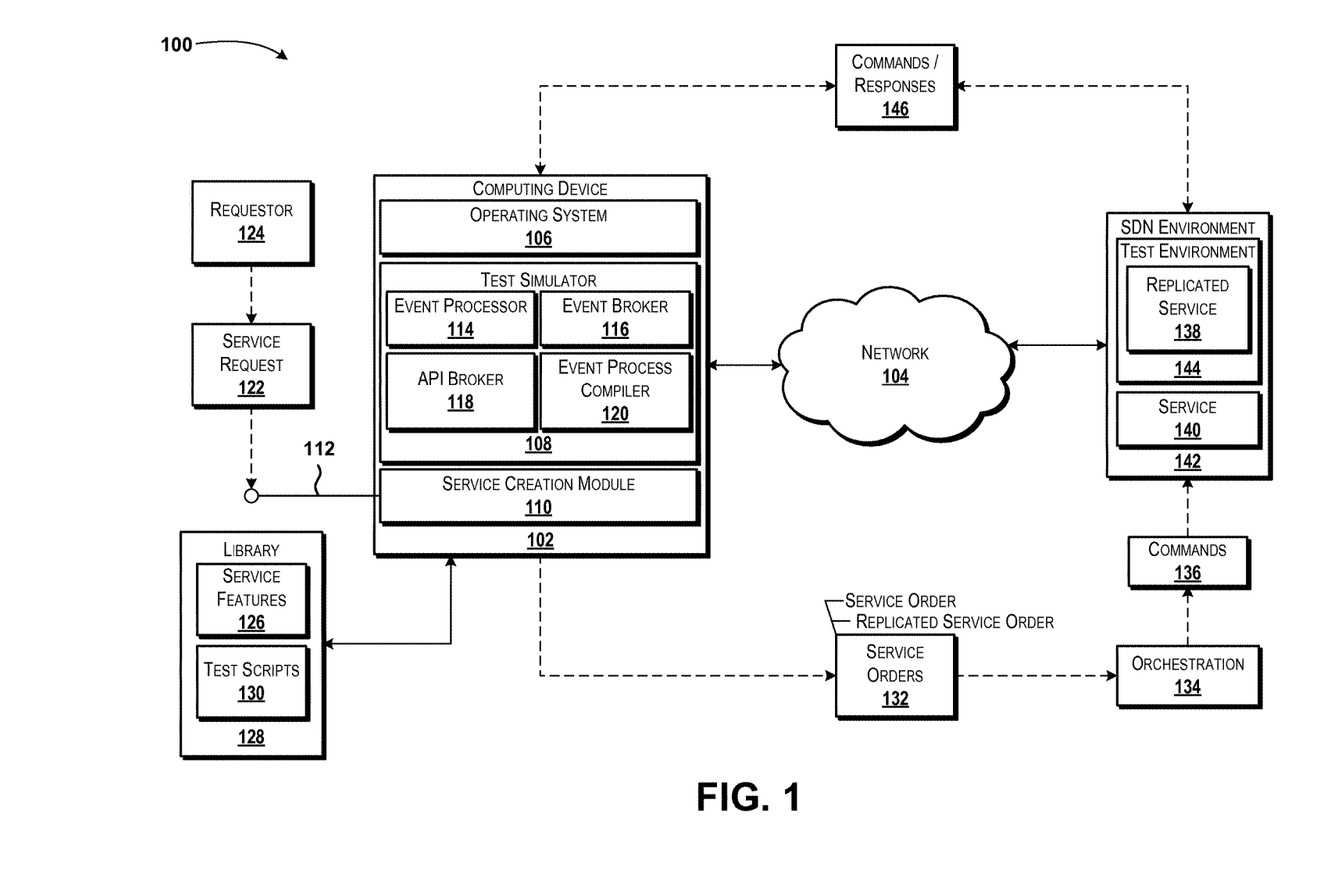
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for test simulation for software defined networking environments will be described, according to an illustrative embodiment. The operating environment 100 shown in FIG. 1 includes a computing device 102. The computing device 102 can operate in communication with and/or as part of a communications network ("network") 104, though this is not necessarily the case.

According to various embodiments, the functionality of the computing device 102 may be provided by one or more server computers, desktop computers, mobile telephones, laptop computers, set-top boxes, embedded computing systems, other computing systems, and the like. It should be understood that the functionality of the computing device 102 can be provided by a single device, by two similar devices, by distributed computing devices, and/or by two or more dissimilar devices. For purposes of describing the concepts and technologies disclosed herein, the computing device 102 is described herein as a server computer. It should be understood that this embodiment is illustrative, and should not be construed as being limiting in any way.

The computing device 102 can execute an operating system 106 and one or more application programs such as, for example, a test simulator 108, a service creation module 110, and/or other application programs. The operating system 106 can include a computer program that controls the operation of the computing device 102. The application programs (e.g., the test simulator 108 and the service creation module 110) can include executable programs and/or program modules that can be configured to execute on top of the operating system 106 to provide various functionality as illustrated and described herein for test simulation in software defined networking environments. The functionality of the test simulator 108 and the service creation module 110 will be described in more detail below.

The service creation module 110 can be configured to support creation of services and/or service components. As will be explained in more detail below, the service creation module 110 can be configured to expose a service creation portal 112 via which users, programs, applications, and/or other entities can invoke and/or access the functionality of the service creation module 110. The service creation portal 112 can include, in some embodiments, a web portal or the like. In some other embodiments, the service creation portal 112 can include an application programming interface ("API") via which applications and/or services can invoke service creation functionality associated with the computing device 102. Because the service creation module 110 can be invoked in additional and/or alternative manners, it should be understood that these examples are illustrative and therefore should not be construed as being limiting in any way.

In some embodiments of the concepts and technologies described herein, as shown in FIG. 1, the test simulator 108 can include one or more program modules that can provide various functions as illustrated and described herein in more detail below. As shown in FIG. 1, the test simulator 108 can include an event processor 114, an event broker 116, an API broker 118, and an event process compiler 120. Although these modules are shown as components of the test simulator 108, it should be understood that this is for purposes of illustration and not limitation. In particular, these and/or other modules may be executed as standalone applications by the computing device 102 or other devices, and/or the functionality of these modules can be provided by the test simulator 108. Thus, the division of the functionality of the test simulator 108 into these modules is illustrated for purposes of clarifying the description of these modules and therefore should not be construed as being limiting in any way.

The event processor 114 can be configured to detect and/or receive service order events from the service creation module 110, the service creation portal 112, and/or other entities. According to various embodiments of the concepts and technologies described herein, the computing device 102 can receive a service request 122. The service request 122 can be received, for example, via the service creation portal 112. According to various embodiments of the concepts and technologies described herein, the service request 122 can be received from a requestor 124. The requestor 124 can include a network operator, a network customer, one or more OSS/BSS personnel, combinations thereof, or the like. The service creation module 110 and/or other entity can pass a test request or other service order event to the test simulator to effect creation of a test version of the service.

The service order event can define an order for a service that is to be instantiated and/or activated. According to various embodiments, the event processor 114 can receive the service order event and/or the service order event can be forwarded to the event processor 114 by the service creation module 110. Regardless of how the service order event is detected by the event processor 114, the event processor 114 can determine that the service order event relates to a service that is desired by a user and that is based on a service request 122. The event processor 114 can determine that the service being requested by way of the service request 122 should be tested prior to deployment, in some embodiments. Thus, in various embodiments the event processor 114 can process the service order event and/or the service request 122 (or other service order event) and invoke the event broker 116.

The event broker 116 can be configured to create, based on the service order event (and/or contents of the service request 122), a service object (not shown in FIG. 1). The service object can be created by the event broker 116 based on preferences and/or rules for services. In particular, the event broker 116 (or other modules) can cause the computing device 102 to access a database or other data repository. The database can store various service feature files or templates (referred to herein as "service features") 126. The service features 126 can define; for example by way of code snippets, scripts, or the like; features of services such as data storage, data processing, communication, and/or other functions. These features therefore can be defined by reusable and standard code blocks or snippets that can be stored as the service features 126. The service features can be stored, in various embodiments, in a library 128 that can be hosted or stored by the database, data store, or other data storage device. The functionality of the library 128 therefore can be provided by one or more databases, server computers, desktop computers, mobile telephones, laptop computers, memory storage devices, data storage devices, other computing systems, and the like.

The event broker 116 can analyze the contents of the service request 122, identify one or more features of the service that is requested by the service request 122, and pass the service features to the event process compiler 120. The event process compiler 120 can assemble the service features 126 and build a service object based on rules or preferences such as the service features 126. The service object can represent the service that is being requested.

The event process compiler 120 can return the service object to the event broker 116, which then can request, from or via the API broker 118, inventory information, network configuration information, and/or identification and/or availability information for testing and control systems, network traffic flow information, ticketing and resolution systems, and the like. According to various embodiments of the concepts and technologies described herein, the information can specify a testing environment that will host the version of the service that is being created for testing, as will be more clearly understood below. This information can be provided by various network entities to the event broker via the API broker 118 and eventually back to the event process compiler 120. The event process compiler 120 can use the returned information to generate instructions for instantiating the requested service and/or a version thereof (e.g., a test version or replicated version of the service), as will be explained in more detail below. Additional details of the flow among the components of the test simulator 108 will be illustrated and described below with reference to FIG. 2.

It can be appreciated with reference to the above description that in response to receiving the service request 122 at the computing device 102, a service object can be created to instantiate a test version of a service. As shown in FIG. 1, the library 128 also can store one or more test scripts 130. The test scripts 130 can include files and/or scripts for testing a version of the service requested by way of the service request 122. According to various embodiments, the test scripts 130 can include extensible markup language ("XML") files that can be used to test a version of the service within a testing environment, as will be explained in more detail below.

The computing device 102 can be configured to generate one or more service orders 132 based upon the service request 122 and the service features 126. In some embodiments, for example, the computing device 102 can be configured to map one or more features of an application or other service requested by way of the service request 122 to the service features 126. Based on this mapping, the computing device 102 can be configured to generate one or more service orders 132. As shown in FIG. 1, the service orders 132 can include service orders for an actual service to be instantiated and/or activated or a replicated service order, the functionality of which is illustrated and described in more detail herein. It should be understood that this example is illustrative and therefore should not be construed as being limiting in any way.

The computing device 102 can transmit the service orders 132 to an orchestration function 134 (labeled "orchestration" in FIG. 1). The orchestration function 134 can receive the service orders 132 and generate one or more commands 136 for instantiating a replicated service 138 (e.g., a test version of a service) or the service 140 (e.g., a production version of the service that is replicated by way of the replicated service 138). According to various embodiments, the replicated service 138 and/or the service 140 can be instantiated within a software defined networking ("SDN") environment 142. In particular, the replicated service 138 can be instantiated within a test environment 144 that can be controlled and/or monitored by the computing device 102 as illustrated and described herein, and the service 140 can be instantiated (in some embodiments, after verifying functioning of the replicated service 138 within the test environment 144) directly within the SDN environment 142. It should be understood that this example is illustrative and therefore should not be construed as being limiting in any way.

During testing of the replicated service 138 within the test environment 144, the computing device 102 can control and/or monitor the operation and/or performance of the replicated service 138. In some embodiments, the computing device 102 can exchange commands and/or responses 146 (labeled "commands/responses" in FIG. 1) with the SDN environment 142 and/or the test environment 144 hosted by the SDN environment 142. In particular, the test scripts 130 can be obtained by the test simulator 108 and included in the commands/responses 146. Thus, the test scripts 130 can be executed against the replicated service 138 to determine how the replicated service 138 behaves during operation.

The test scripts 130 can include, for example, XML files for testing various aspects of the replicated service 138. The test scripts 130 can simulate various conditions that may be experienced by the service 140 when the service 140 is instantiated. Thus, the test scripts 130 can be used to simulate operation of the service 140 within the test environment 144 without requiring test equipment and/or dedicated hardware.

According to various embodiments, the test scripts 130 can be configured to test communication paths associated with the replicated service 138. In various embodiments, the test scripts 130 can test each connecting point between components of the replicated service 138, configuration of the connecting points and/or data flows between the components of the replicated service 138, and capacities of virtual paths between the components of the replicated service 138. If any errors are detected in any of these connecting points and/or along any of these paths, the test simulator 108 can detect the errors. Such an error can be detected, for example, if a path does not support communications associated with the replicated service 138 (e.g., the capacity of the connecting point and/or the path are not sufficient to support communications associated with the replicated service 138). If no errors are detected along the paths and/or the connecting points, the test simulator 108 can verify the paths and connections. Because the connecting points and/or communication paths can be verified in additional and/or alternative manners, it should be understood that these examples are illustrative and therefore should not be construed as being limiting in any way.

The test simulator 108 also can test the various service assurance functions associated with the replicated service 138. In particular, the test scripts 130 can be configured to test the replicated service 138 for handling of various proactive maintenance functions, reactive maintenance functions, and adaptive maintenance functions.

According to various embodiments, the test scripts 130 can be used to simulate one or more device outages. For example, the test scripts 130 can simulate a hardware failure at one or more devices associated with the replicated service 138 to determine how the replicated service 138 responds to device outages. Thus, the test scripts 130 can test whether the replicated service 138 generates a trouble ticket or other maintenance order associated with the simulated device outage, whether the trouble ticket is linked by the replicated service 138 with a network ticket, and whether the replicated service 138 sends the generated trouble ticket to an appropriate recipient for resolution (e.g., a customer care center, an engineering center, a BSS/OSS entity, combinations thereof, or the like). Because other aspects of how the replicated service 138 reacts to device outages can be evaluated, it should be understood that these examples are illustrative and therefore should not be construed as being limiting in any way.

If any errors are detected in response to the simulated device outages (e.g., if any errors are detected in trouble ticket generation, trouble ticket linking, and/or trouble ticket routing), the test simulator 108 can detect the errors and fail the replicated service 138 (or not verify such functions of the replicated service 138). If no errors are detected, the test simulator 108 can verify these functions of the replicated service 138. Because the device outage handling functionality of the replicated service 138 can be verified in additional and/or alternative manners, it should be understood that these examples are illustrative and therefore should not be construed as being limiting in any way.

According to various embodiments, the test scripts 130 also can be used to simulate one or more network outages. For example, the test scripts 130 can simulate a network failure between one or more components (or devices such as virtual machines) of the replicated service 138 to determine how the replicated service 138 responds to network outages. Thus, the test scripts 130 can test, for example, whether the replicated service 138 correctly reroutes traffic during network outages. In some embodiments, the test scripts 130 can be used to determine if the replicated service 138 reroutes the traffic in realtime (e.g., within a second or less) and/or whether the traffic is rerouted along the shortest path available to determine if the replicated service 138 responds to network outages appropriately. Because other reactions of the replicated service 138 to network outages can be monitored and/or measured, it should be understood that these examples are illustrative and therefore should not be construed as being limiting in any way.

If any errors are detected in response to the simulated network outages (e.g., if traffic is not rerouted quickly enough and/or if traffic is not rerouted along the shortest available path), the test simulator 108 can detect the errors and fail the replicated service 138 (or not verify such functions of the replicated service 138) at least with respect to network outage handling. If no errors are detected, the test simulator 108 can verify the network outage handling functions of the replicated service 138. Because the network outage handling functionality of the replicated service 138 can be verified in additional and/or alternative manners, it should be understood that these examples are illustrative and therefore should not be construed as being limiting in any way.

The test scripts 130 also can be used to test trouble ticket handling functionality of the replicated service 138. In particular, the test scripts 130 can be used to determine if trouble tickets (e.g., trouble tickets created for device outages, network outages, and/or other detected failures) are closed when the issues being tested (e.g., device outages, network outages, or the like) are resolved. Thus, the test scripts 130 can be used to verify that service associated with the replicated service 138 is restored when the network outages, device outages, or other failures are resolved. Also, the test scripts 130 can be used to verify that trouble tickets opened when failures were detected are closed when the failures are resolved.

If any errors are detected during the trouble ticket handling testing, (e.g., if service is not restored and/or if trouble tickets are not closed out correctly when the underlying failures are resolved), the test simulator 108 can detect the errors and fail the replicated service 138 or not verify such functions of the replicated service 138. If no errors are detected, the test simulator 108 can verify the trouble ticket handling functionality of the replicated service 138. Because the trouble ticket handling functionality of the replicated service 138 can be verified in additional and/or alternative manners, it should be understood that these examples are illustrative and therefore should not be construed as being limiting in any way.

If the test simulator 108 determines that the replicated service 138 has passed the testing, the test simulator 108 can pass such an indication to the service creation module 110 or other entity. In some embodiments, the test simulator 108 can determine that the replicated service 138 has passed the testing by determining that no errors have been detected and/or logged during the testing process. Alternatively, the test simulator 108 may determine that any errors or failures of the replicated service 138 have been resolved, and that as such the replicated service 138 has passed the testing.

The service creation module 110 can create a service order 132 for instantiating the service 140, and transmit the service order 132 to the orchestration function 134. It can be appreciated that any failures or errors associated with the replicated service 138 can be resolved and/or corrected by the test simulator 108 and/or the service creation module 110, and reflected by the service order 132. The orchestration function 134 can instantiate the service 140 within the SDN environment 142, and thereby activate the service 140. Thus, some embodiments of the concepts and technologies described herein can provide a way to test and refine a service 140 between order time and deployment without providing the service to a dedicated test device or the like. It should be understood that this example is illustrative and therefore should not be construed as being limiting in any way.

FIG. 1 illustrates one computing device 102, one network 104, one requestor 124, one library 128, one orchestration function 134, and one SDN environment 142. It should be understood, however, that various implementations of the operating environment 100 can include zero, one, or more than one computing device 102; zero, one, or more than one network 104; zero, one, or more than one requestor 124; zero, one, or more than one library 128; zero, one, or more than one orchestration function 134; and/or zero, one, or more than one SDN environment 142. As such, the illustrated embodiment should be understood as being illustrative, and should not be construed as being limiting in any way.

Figure 2:
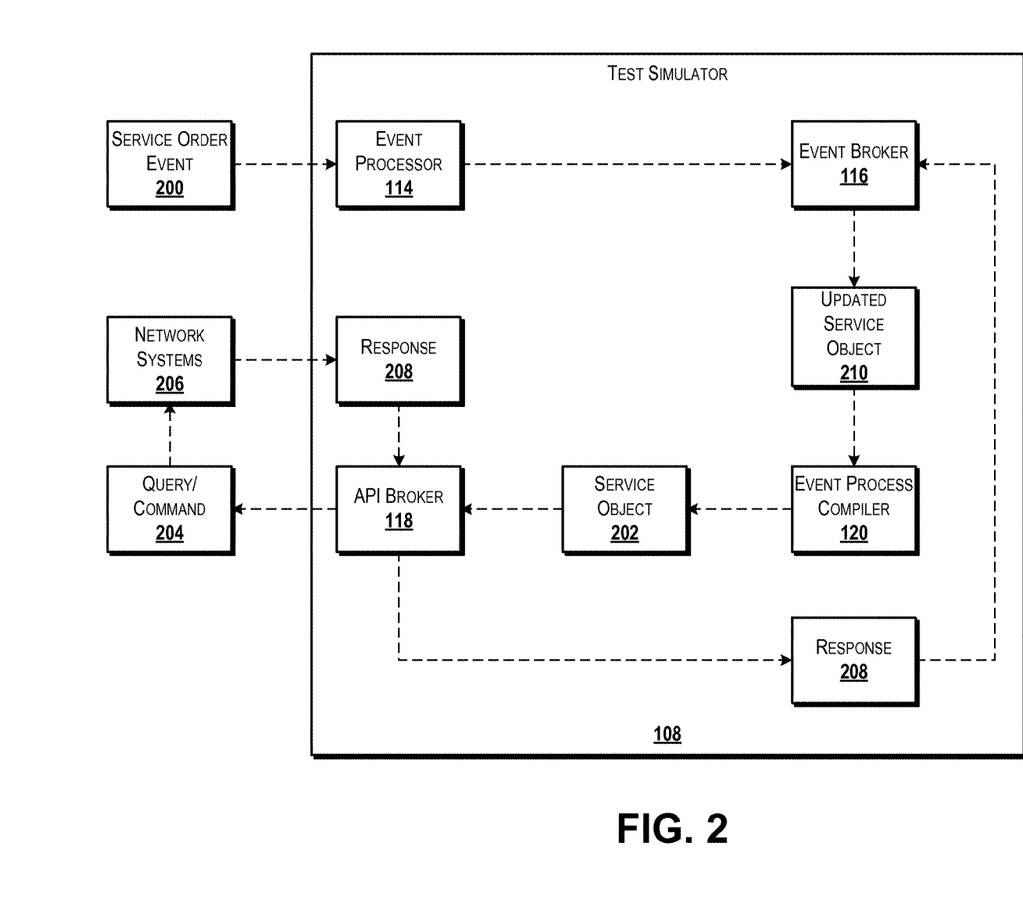
FIG. 2 is a block diagram illustrating aspects of a test simulator, according to some example embodiments of the concepts and technologies described herein.

FIG. 2 is a block diagram that illustrates additional aspects of the test simulator 108, according to various embodiments of the concepts and technologies described herein. In particular, FIG. 2 illustrates additional aspects of how the various components of the test simulator 108 interact with one another in one example embodiment of the concepts and technologies described herein. While some aspects of FIG. 2 have been illustrated and described above with reference to FIG. 1, additional details are shown in FIG. 2. It should be understood that the illustrated embodiment is illustrative of one contemplated embodiment of the concepts and technologies described herein and therefore should not be construed as being limiting in any way.

As noted above, a service order event 200 can be received by the event processor 114. From the description of FIG. 1, it can be appreciated that the service order event 200 can be generated by the service creation module 110 and/or other entities (not shown in FIG. 2). It also can be appreciated that the service order event 200 can include or correspond to a request to test a service that is being requested by a service request 122. As such, the service order event 200 can include the service request 122, can actually be the service request 122, can reference the service request 122, and/or otherwise can communicate the contents of the service request 122 to the event processor 114.

The event processor 114 can analyze the service order event 200 and invoke the event broker 116. The event broker 116 can determine, based upon the service order event 200 and/or based upon contents of the service request 122, what features will be included in the service 140 being requested by the service request 122. As explained above, the event broker 116 can map the features of the service being requested to the service features 126 or the like. As noted above, the event broker 116 can use preferences and/or rules to identify the service features 126. The event broker 116 can interact with the event process compiler 120 to generate and output a service object 202. The service object 202 can reflect the service 140 being requested and can be used to generate a service order 132 as illustrated and described with reference to FIG. 1.

The service object 202 can be passed to the API broker 118. The API broker 118 can request network information from one or more network systems 206 via one or more requests such as queries or commands 204 (labeled query/command 204 in FIG. 2). The network systems 206 can respond with answers and/or outcomes 208 (labeled response 208 in FIG. 2), and the API broker 118 can forward the response 208 to the event broker 116. The event broker 116 can use the response 208 to modify the service object 202 to create an updated service object 210, which can be sent to the event process compiler 120. The updated service object 210 can be compiled and used to generate the service order 132, as shown in FIG. 1. Because additional and/or alternative flows are possible between and/or among the components of the test simulator 108, it should be understood that this example is illustrative and therefore should not be construed as being limiting in any way.

Figure 3:
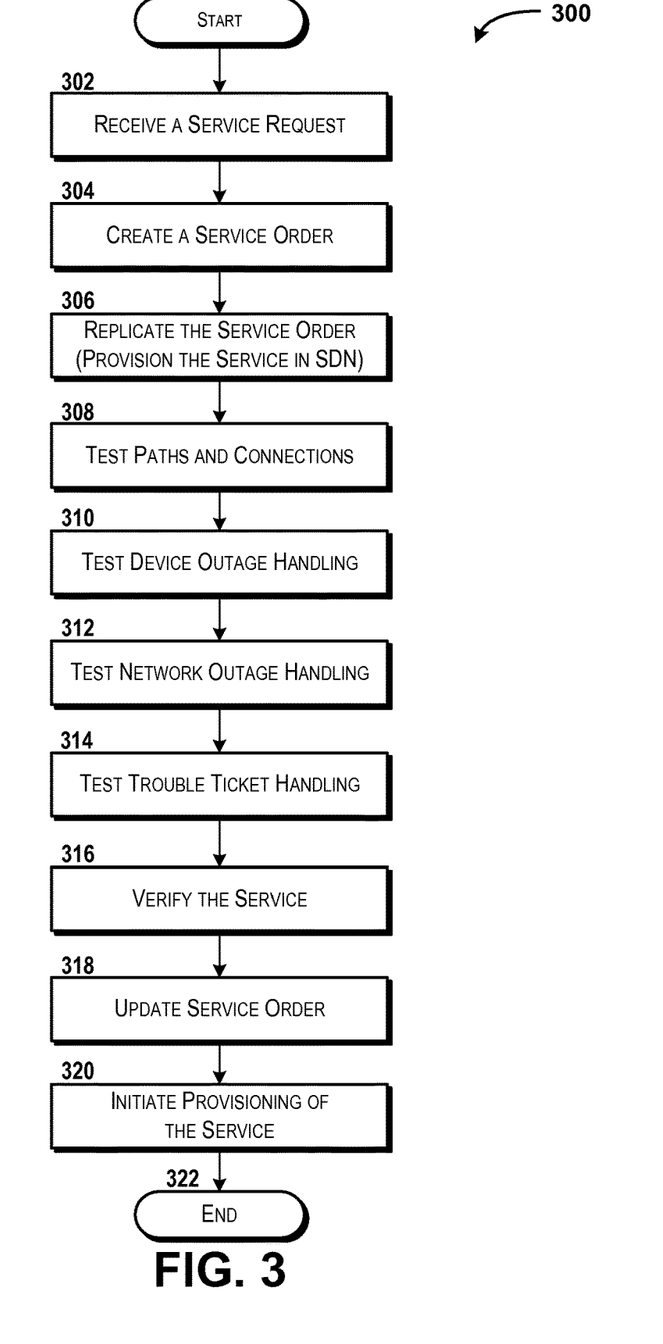
FIG. 3 is a flow diagram showing aspects of a method for building, testing, and provisioning a service, according to an illustrative embodiment of the concepts and technologies described herein.

Turning now to FIG. 3, aspects of a method 300 for building, testing, and provisioning a service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the computing device 102, to perform one or more operations and/or causing the processor to direct other components of the computing system or device to perform one or more of the operations.

For purposes of illustrating and describing the concepts of the present disclosure, the method 300 disclosed herein is described as being performed by the computing device 102 via execution of one or more software modules such as, for example, the test simulator 108 and/or one or more components thereof such as the event processor 114, the event broker 116, the API broker 118, the event process compiler 120, and/or other modules or components. It should be understood that additional and/or alternative devices and/or network nodes can provide the functionality described herein via execution of one or more modules, applications, and/or other software including, but not limited to, the test simulator 108 and/or the various modules illustrated and described herein. Thus, the illustrated embodiments are illustrative, and should not be viewed as being limiting in any way.

The method 300 begins at operation 302. At operation 302, the computing device 102 can receive a service request such as the service request 122. It can be appreciated that the service request 122 received in operation 302 can be generated by a requestor such as the requestor 124, though this is not necessarily the case. The computing device 102 can execute a service creation module 110 as well as the test simulator 108, and as such, the service request 122 received in operation 302 can correspond to a service call (e.g., the test simulator 108 and/or the service creation module 110 can operate as callable services that can create services and/or manage testing of services as part of service creation). The service request 122 also can include an explicit request (e.g., the service creation module 110 or other entity responsible for service creation can pass the service request 122 to the computing device 102 for testing). In yet other embodiments, the service request 122 can include other types of implicit and/or explicit requests. Regardless of how the request is made, the computing device 102 can determine, in operation 302, that creation of a service 140 has been requested, and therefore can determine that creation of the service 140 and/or testing of the service 140 should be completed.

From operation 302, the method 300 can proceed to operation 304. At operation 304, the computing device 102 can create a service order 132 based on the service request 122 received in operation 302. The computing device 102 and/or one or more applications or modules executed by the computing device 102 (e.g., the service creation module 110 or the like) can be configured to determine, based upon the service request 122, one or more features of the service that is being requested by the service request 122. The computing device 102 can generate, based on these determinations, a service order 132 that can be deployed to the orchestration function 134 or other functionality to instantiate and/or activate the service being requested by the service request 122.

According to various embodiments of the concepts and technologies described herein, the computing device 102 may be configured to test the service before deploying the service order 132. Thus, various embodiments of the concepts and technologies described herein include creating the service order 132 and replicating the service order 132 for deployment in a test environment 144 before deploying the service order 132 for instantiation of the service 140. It should be understood that this example is illustrative and therefore should not be construed as being limiting in any way.

From operation 304, the method 300 can proceed to operation 306. At operation 306, the computing device 102 can replicate the service order 132 created in operation 304. Thus, in operation 306, the computing device 102 can create the replicated service order illustrated and described in FIG. 1. The replicated service order can be configured to instantiate a version of the service 140 requested by way of the service request 122. As shown in FIG. 1, the version of the service 140 can correspond to the replicated service 138. The replicated service 138 can be essentially identical to the service 140, but can operate within the test environment 144, which can be a dedicated testing environment within the SDN environment 142, in some embodiments. Thus, in replicating the service order 132, the computing device 102 can be configured to mirror some or all of the service components, but tailor the service order 132 such that the replicated service 138 is deployed to the test environment 144 instead of the SDN environment 142. It should be understood that this example is illustrative and therefore should not be construed as being limiting in any way.

According to various embodiments of the concepts and technologies described herein, the computing device 102 can transmit the service order 132 to the orchestration function 134 in operation 306 to effect instantiation of the replicated service 138 within the test environment 144. Thus, creating the service order 132 can include providing the service order 132 to the orchestration function 134 or other functionality that can be configured to deploy the replicated service 138 as illustrated and described herein. It should be understood that this example is illustrative and therefore should not be construed as being limiting in any way.

From operation 306, the method 300 can proceed to operation 308. At operation 308, the computing device 102 can test paths and connections associated with the replicated service 138 or other version of the service instantiated in operation 306. As explained above, the computing device 102 can test the replicated service 138 using the test scripts 130 or other files. In various embodiments, the test scripts 130 are provided by XML files. A main XML file can be used to coordinate testing of the replicated service 138, in some embodiments. For example, the main XML file can detail an order in which the test scripts 130 are run or executed or the like. It should be understood that this example is illustrative and therefore should not be construed as being limiting in any way.

In operation 308, the computing device 102 can test communication paths and/or connecting points associated with the replicated service 138. The computing device 102 can test each connecting point between components of the replicated service 138, configuration of the connecting points and/or data flows between the components of the replicated service 138, and capacities of virtual paths between the components of the replicated service 138. If any errors are detected in any of these connecting points and/or along any of these paths, the computing device 102 can capture these errors and/or create an error log to store data indicating the errors. Thus, if a path does not support communications associated with the replicated service 138, the computing device 102 can detect an error in the replicated service 138. Other types of errors are possible and are contemplated. At any rate, if the computing device 102 does not detect any errors along the paths and/or at or in the connecting points, the computing device 102 can verify the paths and connections. Because the connecting points and/or communication paths can be verified in additional and/or alternative manners, it should be understood that these examples are illustrative and therefore should not be construed as being limiting in any way.

From operation 308, the method 300 can proceed to operation 310. At operation 310, the computing device 102 can test device outage handling functionality of the replicated service 138 or other version of the service instantiated in operation 306. As explained above, the computing device 102 can use the test scripts 130 to simulate one or more device outages at the replicated service 138. From the perspective of the replicated service 138, a device outage has occurred, but in reality the replicated service 138 is operating in the test environment 144 and the device outages are simulated. The simulated device outages can include, for example, a simulated hardware failure at one or more devices associated with the replicated service 138, a simulated component failure associated with a device, combinations thereof, or the like.

The computing device 102 can test the replicated service 138 to determine how the replicated service 138 responds to device outages. Thus, the computing device 102 can test whether the replicated service 138 generates a trouble ticket or other maintenance order associated with the simulated device outage, whether the trouble ticket is linked by the replicated service 138 with a network ticket, and whether the replicated service 138 sends the generated trouble ticket to an appropriate recipient for resolution (e.g., a customer care center, an engineering center, a BSS/OSS entity, combinations thereof, or the like). It should be understood that these examples are illustrative and therefore should not be construed as being limiting in any way.

If the computing device 102 detects any errors in response to the simulated device outages, the computing device 102 can detect the errors. As noted above, the errors can be logged by the computing device 102 and/or addressed (e.g., corrected) by the computing device 102, in some embodiments. If no errors are detected, the computing device 102 can verify these functions of the replicated service 138. Because the device outage handling functionality of the replicated service 138 can be verified in additional and/or alternative manners, it should be understood that these examples are illustrative and therefore should not be construed as being limiting in any way.

From operation 310, the method 300 can proceed to operation 312. At operation 312, the computing device 102 can test network outage handling functionality of the replicated service 138 or other version of the service instantiated in operation 306. In particular, the computing device 102 can simulate a network failure between one or more components or devices associated with the replicated service 138 to determine how the replicated service 138 responds to network outages. Thus, the test scripts 130 can test whether the replicated service 138 correctly reroutes traffic during network outages, whether such rerouting occurs in an acceptable timeframe, or the like. In some embodiments, for example, the computing device 102 can determine if the replicated service 138 reroutes the traffic in realtime (e.g., within a second or less) and/or whether the traffic is rerouted along the shortest path available to determine if the replicated service 138 responds to network outages appropriately. It should be understood that these examples are illustrative and therefore should not be construed as being limiting in any way.

If the computing device 102 detects any errors in response to the simulated network outages (e.g., if traffic is not rerouted quickly enough and/or if traffic is not rerouted along the shortest available path), the computing device 102 can detect the errors, log the errors, fail the replicated service 138 or not verify such functions of the replicated service 138, correct the detected errors, or take additional and/or alternative actions. If no errors are detected, the computing device 102 can verify the network outage handling functions of the replicated service 138. Because the network outage handling functionality of the replicated service 138 can be verified in additional and/or alternative manners, it should be understood that these examples are illustrative and therefore should not be construed as being limiting in any way.

From operation 312, the method 300 can proceed to operation 314. At operation 314, the computing device 102 can test trouble ticket handling functionality of the replicated service 138 or other version of the service instantiated in operation 306. The computing device 102 can determine if trouble tickets created by the replicated service 138 (e.g., trouble tickets created for device outages, network outages, and/or other detected failures) are closed by the replicated service 138 when the issues being tested (e.g., device outages, network outages, or the like) are resolved. Thus, the computing device 102 can use the test scripts 130 to verify that service associated with the replicated service 138 is restored when the network outages, device outages, or other failures are resolved and/or that the replicated service 138 closes trouble tickets that were opened when failures have been resolved.

If the computing device 102 detects any errors during the trouble ticket handling testing, (e.g., if service is not restored and/or if trouble tickets are not closed out correctly when the underlying failures are resolved), the computing device 102 can detect the errors, log the errors, fail the replicated service 138, not verify such functions of the replicated service 138, and/or correct the errors, or take other actions. If no errors are detected, the computing device 102 can verify the trouble ticket handling functionality of the replicated service 138. Because the trouble ticket handling functionality of the replicated service 138 can be verified in additional and/or alternative manners, it should be understood that these examples are illustrative and therefore should not be construed as being limiting in any way.

From operation 314, the method 300 can proceed to operation 316. At operation 316, the computing device 102 can verify the replicated service 138 or other version of the service instantiated in operation 306. Thus, in operation 316, the computing device 102 can determine any errors detected and/or logged during operations 308-314 and determine, based on the presence and/or absence of any errors, that the replicated service 138 is or is not to be verified or approved. Thus, operation 316 can include analyzing the testing that has been completed and determining if the replicated service 138 functions correctly. If the replicated service 138 is determined by the computing device 102 to operate correctly, the computing device 102 can verify the replicated service 138. If the replicated service 138 is determined by the computing device 102 to operate incorrectly, the computing device 102 can fail the replicated service 138. As noted above, the computing device 102 also can correct errors detected during the testing, and as such the passing or failing of the replicated service 138 is one example of the concepts and technologies described herein and therefore should not be construed as being limiting in any way.

From operation 316, the method 300 can proceed to operation 318. At operation 318, the computing device 102 can update the service order created in operation 304, if needed. Thus, as explained above, if any changes are needed in the service order 132 based upon any errors detected in operations 308-314, the computing device 102 can update the service order 132 in operation 318. Thus, operation 318 can correspond, in some embodiments, to the computing device 102 updating the service order 132 to correct any detected errors. It should be understood that this example is illustrative and therefore should not be construed as being limiting in any way.

From operation 318, the method 300 can proceed to operation 320. At operation 320, the computing device 102 can initiate provisioning of the service 140. Thus, in operation 320, the computing device 102 can transmit the service order 132 created in operation 304 and/or any updated version thereof to the orchestration function 134. As explained above, the orchestration function 134 can instantiate the service 140 within the SDN environment 142. Thus, embodiments of the concepts and technologies described herein enable testing of a service pre-production, updating of a service order 132 associated with the service, and instantiation of a verified version of the service 140. It should be understood that this example is illustrative and therefore should not be construed as being limiting in any way.

From operation 320, the method 300 can proceed to operation 322. The method 300 ends at operation 322.

Figure 4:
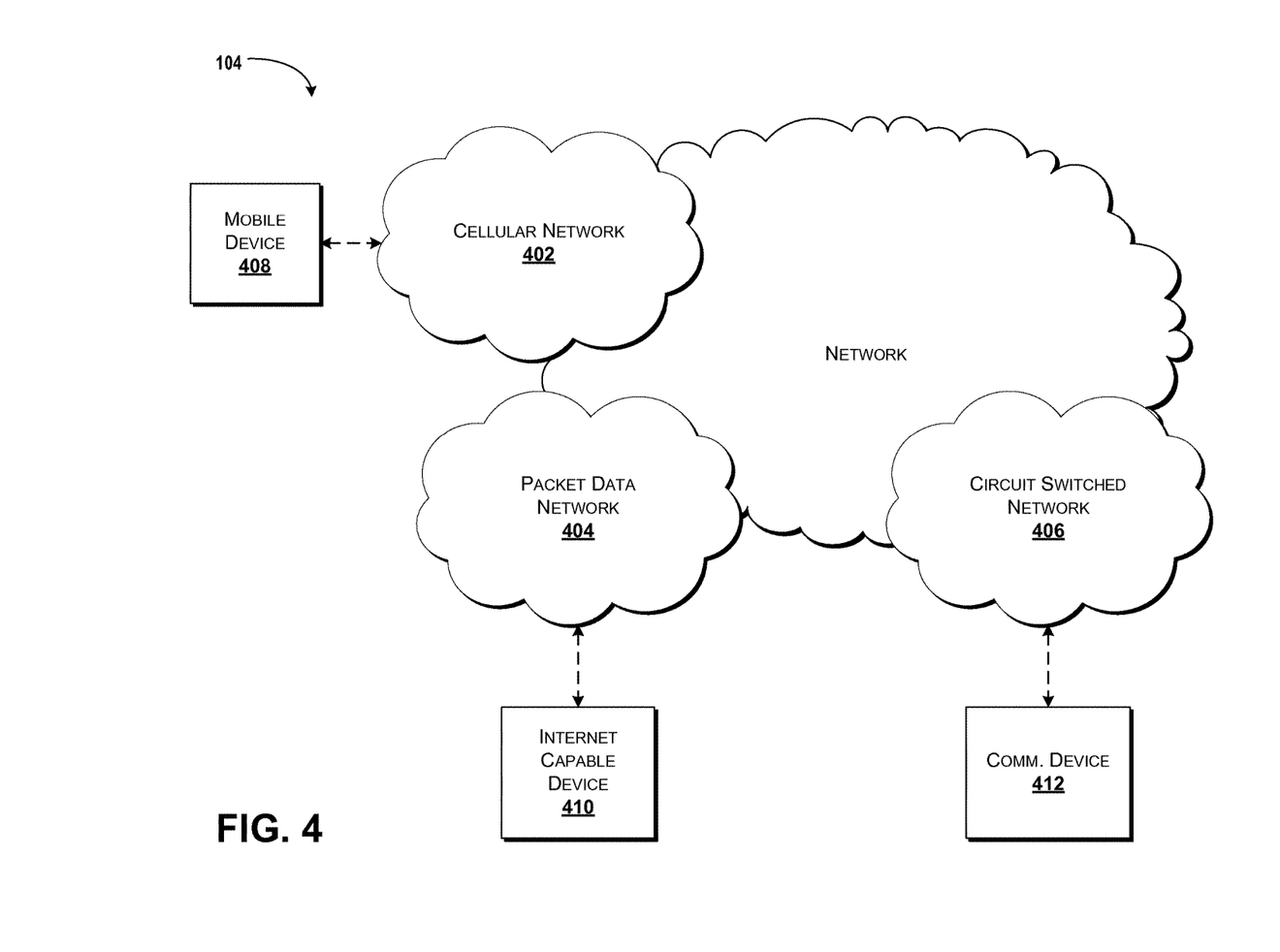
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MME5"), short message service centers ("SMSCs"), multimedia messaging service centers ("MMSCs"), home location registers ("HLR5"), home subscriber servers ("HSSs"), visitor location registers ("VLR5"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
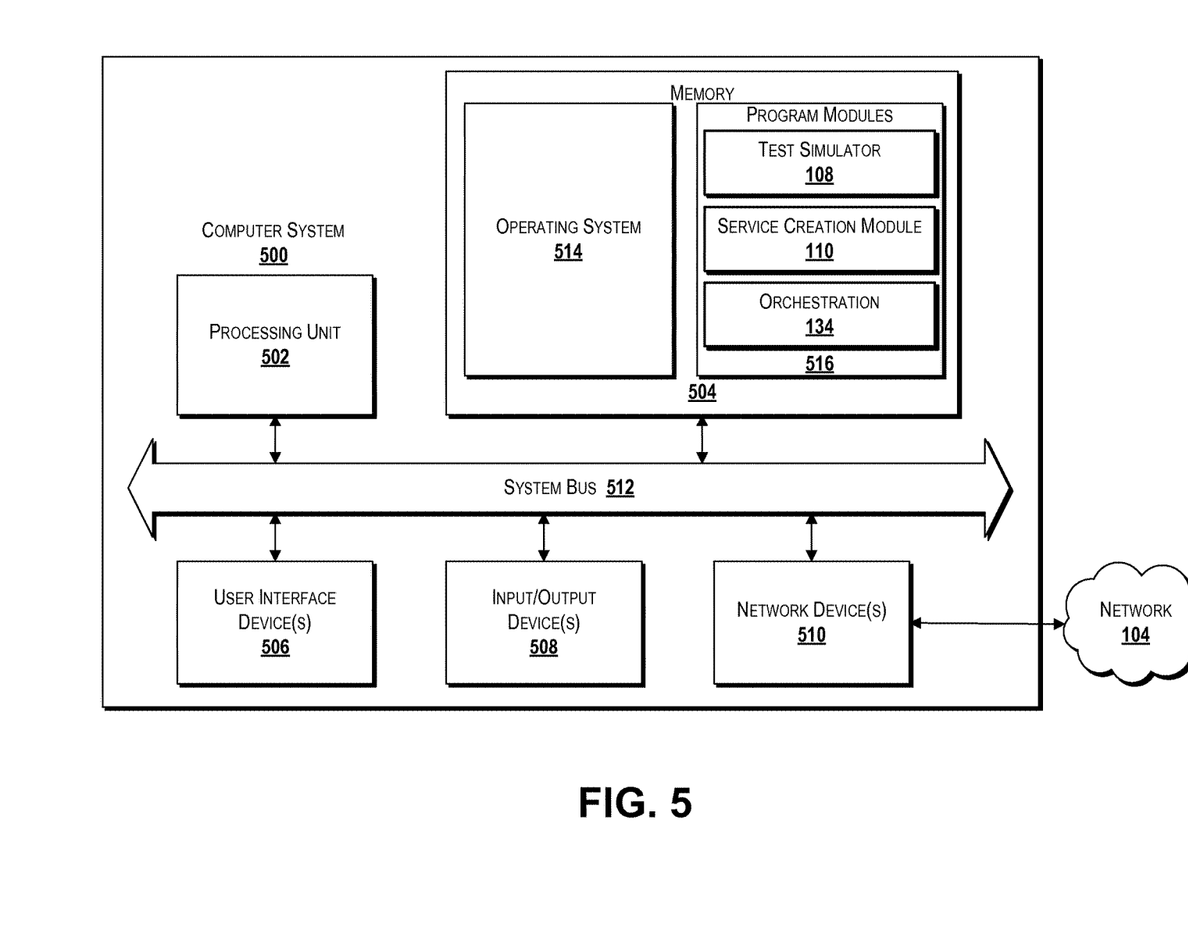
FIG. 5 is a block diagram illustrating an example computer system configured to provide test simulation for software defined networking environments, according to some illustrative embodiments of the concepts and technologies described herein.

FIG. 5 is a block diagram illustrating a computer system 500 configured to provide the functionality described herein for test simulation for software defined networking environments, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 can include the test simulator 108, the service creation module 110, the orchestration function 134, and/or other programs. This and/or other programs can be embodied in computer-readable media containing instructions that, when executed by the processing unit 502, perform one or more methods such as the method 300 described in detail above with respect to FIG. 3. According to embodiments, the program modules 516 may be embodied in hardware, software, firmware, or any combination thereof. Although not shown in FIG. 5, it should be understood that the memory 504 also can be configured to store the service request 122, the service features 126, the test scripts 130, the service orders 132, the commands 136, the replicated service 138, the service 140, the commands/responses 146, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for test simulation for software defined networking environments have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A system comprising:
   a processor; and
   a memory that stores computer-executable instructions that, when executed by the processor, cause the processor to perform operations comprising
      receiving a service request comprising a request to instantiate a service,
      creating a service order based on the service request, the service order comprising instructions to instantiate the service,
      replicating the service order to obtain a replicated service order that comprises instructions to instantiate a replicated service in a test environment, the replicated service comprising a plurality of components,
      testing, within the test environment and using a test simulator, paths and connections between the plurality of components of the replicated service,
      testing, within the test environment and using the test simulator, device outage handling functionality of the replicated service,
      testing, within the test environment and using the test simulator, network outage handling functionality of the replicated service, wherein testing the network outage handling functionality comprises
         simulating a network outage using test scripts comprising extensible markup files, and
         determining if network traffic is rerouted, by the replicated service, to a shortest available path in response to the replicated service detecting a simulated network outage,
      if a determination that the network traffic is rerouted, by the replicated service, to the shortest available path, verifying the replicated service, and
      initiating instantiation of the service requested by the service request.

2. The system of claim 1, wherein testing the device outage handling functionality comprises verifying device outage trouble ticket generation, verifying linking of the device outage trouble ticket to a network ticket, and verifying that the device outage trouble ticket is routed to an appropriate recipient.

3. The system of claim 1, wherein the service request is received via a service creation portal.

4. The system of claim 1, further comprising a software defined networking environment, and wherein the test environment is hosted within the software defined networking environment.

5. The system of claim 1, wherein the computer-executable instructions, when executed by the processor, cause the processor to perform operations further comprising:
testing trouble ticket handling functionality of the replicated service within the test environment using the test simulator, wherein testing the trouble ticket handling functionality comprises determining if the replicated service closes a trouble ticket after a failure associated with the trouble ticket has been resolved.

6. The system of claim 1, further comprising a library that stores the test scripts.

7. The system of claim 1, wherein testing the device outage handling functionality comprises simulating a device outage using the test scripts.

8. The system of claim 1, wherein testing the paths and connections comprises determining if any of the paths and connections of the replicated service support communications during operation of the replicated service.

9. The system of claim 8, wherein the paths and connections are verified if the paths and connections support the communications.

10. A method comprising:
receiving, at a processor that executes a service creation module and a test simulator, a service request comprising a request to instantiate a service;
creating, by the processor, a service order based on the service request, the service order comprising instructions to instantiate the service;
replicating, by the processor, the service order to obtain a replicated service order that comprises instructions to instantiate a replicated service in a test environment, the replicated service comprising a plurality of components;
testing, by the processor and using a test simulator, paths and connections associated with the replicated service within the test environment;
testing, by the processor and using the test simulator, device outage handling functionality of the replicated service within the test environment;
testing, by the processor and using a test simulator, network outage handling functionality of the replicated service within the test environment wherein testing the network outage handling functionality comprises
simulating, using test scripts comprising extensible markup files, a network outage, and
determining if network traffic is rerouted, by the replicated service, to a shortest available path in response to the replicated service detecting a simulated network outage;
if a determination that the network traffic is rerouted, by the replicated service, to the shortest available path, verifying, by the processor, the replicated service; and
initiating, by the processor, instantiation of the service requested by the service request.

11. The method of claim 10, wherein the test environment is hosted within a software defined networking environment.

12. The method of claim 10, further comprising:
testing trouble ticket handling functionality of the replicated service within the test environment using the test simulator, wherein testing the trouble ticket handling functionality comprises determining if the replicated service closes a trouble ticket after a failure associated with the trouble ticket has been resolved.

13. The method of claim 10, wherein testing the device outage handling functionality comprises simulating a device outage using the test scripts.

14. The method of claim 10, wherein testing the paths and connections comprises determining if any of the paths and connections of the replicated service support communications during operation of the replicated service.

15. The method of claim 14, wherein the paths and connections are verified if the paths and connections support the communications.

16. A computer storage medium having computer-executable instructions stored thereon that, when executed by a processor, cause the processor to perform operations comprising:
receiving a service request comprising a request to instantiate a service;
creating a service order based on the service request, the service order comprising instructions to instantiate the service;
replicating the service order to obtain a replicated service order that comprises instructions to instantiate a replicated service in a test environment, the replicated service comprising a plurality of components;
testing, within the test environment using a test simulator, paths and connections associated with the replicated service;
testing, within the test environment and using the test simulator, device outage handling functionality of the replicated service;
testing, within the test environment and using the test simulator, network outage handling functionality of the replicated service, wherein testing the network outage handling functionality comprises
simulating, using test scripts comprising extensible markup files, a network outage, and
determining if network traffic is rerouted, by the replicated service, to a shortest available path in response to the replicated service detecting a simulated network outage;
if a determination that the network traffic is rerouted, by the replicated service, to the shortest available path, verifying the replicated service; and
initiating instantiation of the service requested by the service request.

17. The computer storage medium of claim 16, wherein the computer-executable instructions, when executed by the processor, cause the processor to perform operations further comprising:
testing trouble ticket handling functionality of the replicated service within the test environment using the test simulator, wherein testing the trouble ticket handling functionality comprises determining if the replicated service closes a trouble ticket after a failure associated with the trouble ticket has been resolved.

18. The computer storage medium of claim 16, wherein testing the device outage handling functionality comprises simulating a device outage using the test scripts.

19. The computer storage medium of claim 16, wherein the test environment is hosted within a software defined networking environment.

20. The computer storage medium of claim 18, wherein testing the paths and connections comprises determining if any of the paths and connections of the replicated service support communications during operation of the replicated service.

\* \* \* \* \*